June 5, 1923.

D. W. PARKER

SAW GUIDE

Filed May 11, 1921

1,457,600

2 Sheets-Sheet 1

INVENTOR
Daniel W. Parker
BY
Pierre Barnes
ATTORNEY

June 5, 1923.

D. W. PARKER

SAW GUIDE

Filed May 11, 1921

1,457,600

2 Sheets-Sheet 2

INVENTOR
Daniel W. Parker
BY
Pierre Barnes
ATTORNEY

Patented June 5, 1923.

1,457,600

UNITED STATES PATENT OFFICE.

DANIEL W. PARKER, OF EVERETT, WASHINGTON, ASSIGNOR TO THE PARKER ROTARY STONE SAW COMPANY, OF SAN FRANCISCO, CALIFORNIA, A CORPORATION OF NEVADA.

SAW GUIDE.

Application filed May 11, 1921. Serial No. 468,540.

*To all whom it may concern:*

Be it known that I, DANIEL W. PARKER, a citizen of the United States, residing at Everett, in the county of Snohomish and State of Washington, have invented certain new and useful Improvements in Saw Guides, of which the following is a specification.

This invention relates to saw guides and is designed, more especially, for use with circular saws which are mounted upon an arbor in a swinging frame such, for example, as illustrated and described in Patent No. 1,143,856 issued to me June 22, 1915, and with the type of saws disclosed in Patent No. 1,293,897, issued to me February 11, 1919, having attached teeth of greater thickness than the respective plate.

An object of the present invention is the provision of a saw guide or a series of saw guides which are peculiarly adapted to be used in applications such as above referred to and arranged to be readily regulated to accommodate both the rotary and the swinging movements of the saws and to operate in close proximity to the work for different depths of saw cuts.

Other objects and advantages will appear in the following description.

The invention consists in the novel construction, adaptation and combination of parts hereinafter described and claimed.

In the accompanying drawings,—

Figure 1:
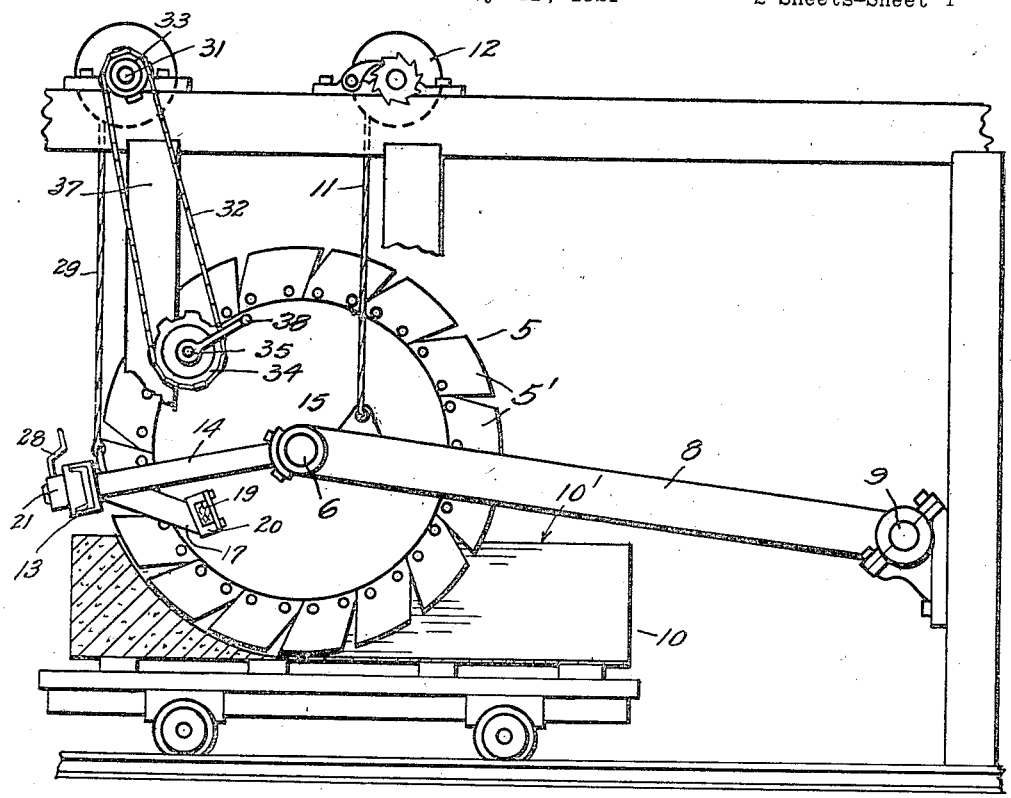
Figure 4:
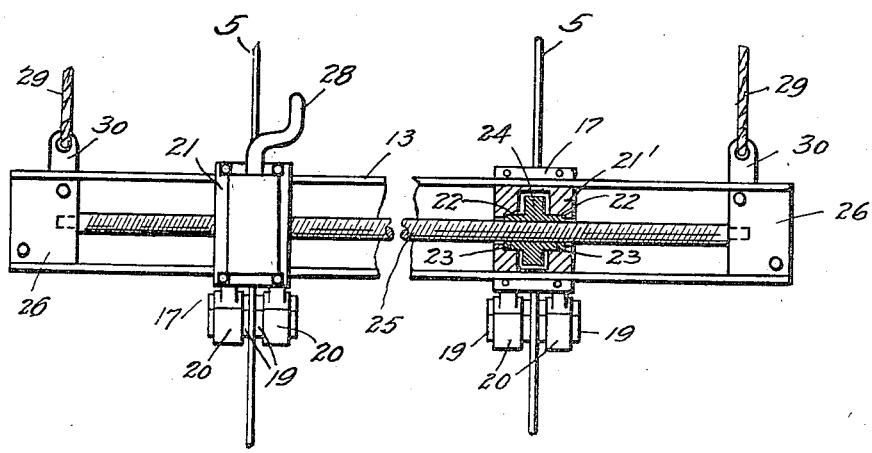
Figure 2:
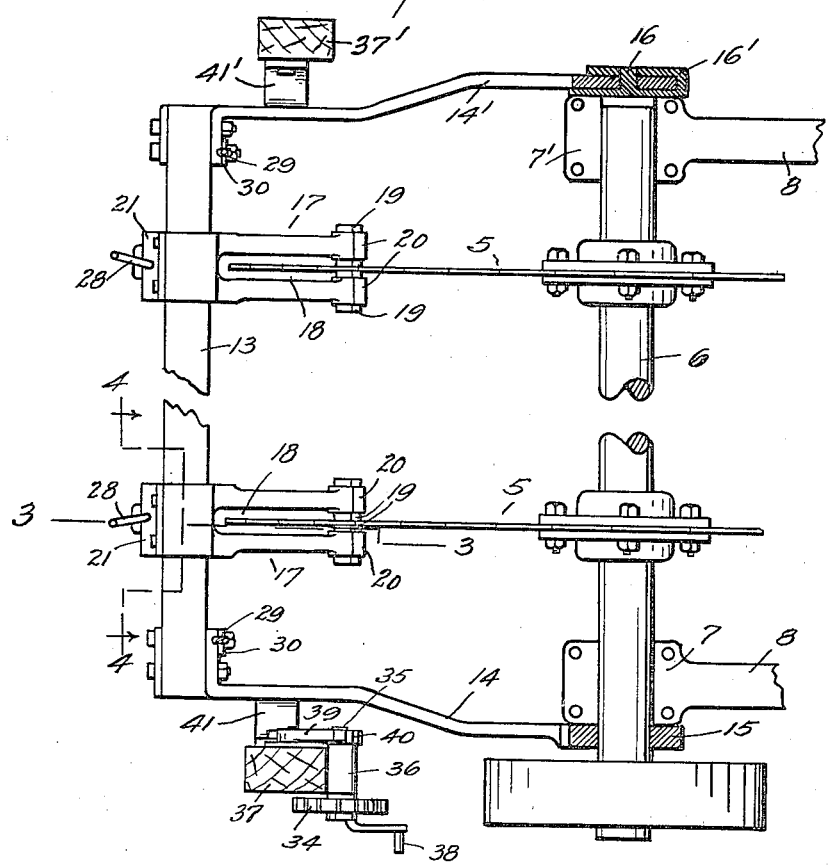
Figure 3:
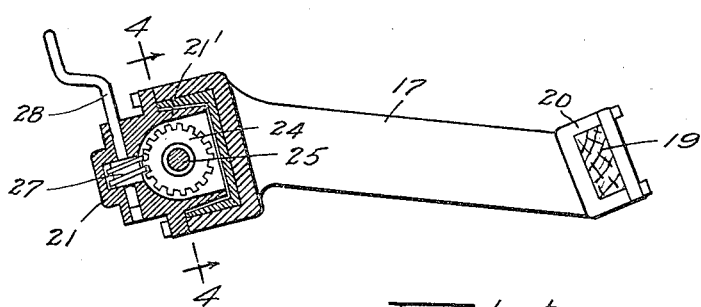

Figure 1 is a side elevation of a stone sawing machine with devices embodying the present invention applied thereto. Fig. 2 is a fragmentary plan view of Fig. 1, shown partly in horizontal section. Fig. 3 is a vertical section through 3—3 of Fig. 2. Fig. 4 is a view partly in end elevation and partly in section of the saw guide frame, said section being taken substantially on a line 4—4 of Figs. 2 and 3.

In said drawings, the reference numerals 5 represent circular saws mounted upon an arbor 6 which is journaled in boxes 7 and $7^1$ provided in the side members 8 of a swinging saw-frame which is pivoted at 9.

To regulate the depths of the saw cuts in a block of stone 10 said frame is raised or lowered as by means of a hoisting and supporting cable 11 and a winding drum 12.

According to the present invention, saw guiding devices are mounted for independent transverse movements upon a bar member of a guide frame which is arranged to be swung about the axis of the arbor 6 to position the guides in operative relations to the work.

More particularly, said guide frame comprises a channel bar 13 disposed transversely of the machine and rigidly secured at its ends to arms 14 and $14^1$.

The arm 14 is connected as by a collar element 15 to the arbor 6 and the other arm $14^1$ is pivotally connected to a stud 16 coaxial with the arbor and secured to the arbor box $7^1$ by a bracket attachment $16^1$.

For each of the saws 5, two being shown in the drawings, is provided an arm 17 having a slot 18 into which the associated saw 5 extends. A pair of opposed saw engaging blocks 19, preferably wood, are secured in housings 20 provided in the ends of the arm bifurcations. The other end of an arm is recessed to receive the channel bar 13 to which the arm is connected by a cap block 21 for movements longitudinally to the bar.

As shown in Fig. 3, a cap block 21 extends as at $21^1$ into the channel of the bar 13 and is bored at 22 (Fig. 4) to furnish journal bearings for the hubs 23 of a worm wheel 24.

Each of said worm wheels is internally screw threaded to serve as a nut upon an adjusting screw 25 whose ends are secured in blocks 26 rigid with the channel bar and constituting a part of the aforesaid swinging frame. Each of the worm wheels 24 is rotatable by means of a worm 27 having a crank spindle 28 mounted in the respective cap block.

By rotating manually a crank spindle 28 the worm wheel 24 thereof is caused to rotate on the screw 25 thereby imparting lateral motion to an arm 17 for regulating the location of the guide blocks 19 to correspond with the position on the arbor of the saw pertaining to the affected guide blocks.

The guide blocks 19 are, moreover, adjustable vertically to present the same in proximity to the plane of the upper surface $10^1$ of the work or stone which is to be sawed.

As shown, such elevation regulating means comprise cables 29 connected to attachments 30 of the guide frame and extend about an overhead shaft 31 which is rotated in one direction or the other to wind or unwind the cable on or from the same.

The illustrated means for rotating the shaft 31 consists of an endless chain 32 passing about sprocket wheels 33 and 34 respectively mounted on the shaft 31 and a shaft 35 which is rotated in a bearing box 36 secured to a post 37.

The shaft 35 is rotated by a hand wheel or a crank 38 as shown, and is controlled by a pawl 39 engaging a ratchet wheel 40 mounted on the shaft 35.

41 and 41¹ represent attachments to posts 37 and 37¹ at opposite sides of the guide frame and serve as guides to obviate any lateral sway or distortion of the guide frame.

From the foregoing, it is to be noted that each saw guide is shiftable independently of the others by operating the respective worm wheel 24 through the medium of a crank spindle 28, but that all of the guides are raised or lowered in unison by means of the cables 29 through the instrumentality of the chain 32. The saw guides are furthermore swingable about the axis of the saw arbor 6 to cause the same to be revolubly movable within the circle of saw tooth atachments 5¹.

What I claim, is,—

1. The combination with a saw, the arbor therefor, a swingable frame carrying said arbor, and means connected to said frame for regulating the elevation of the saw, of a pair of guides for said saw, a support for the guides, said support being connected to the frame for movements concentrically about the arbor axis, and means for adjusting the position of said support for regulating the positions of the guides with respect to the work.

2. The combination with a saw, the arbor therefor, and means to adjustably move the said saw and arbor into predetermined elevations, of guides for said saw, a support for said guides, said support being arranged for movements concentrically about the axis of said arbor, and means for regulating the positions of said support parallel with the axis of said arbor.

3. In a sawing machine, an arbor, a plurality of saws mounted thereon at selected distances apart, guiding devices for the respective saws, a frame supporting the saw guiding devices, means operating through the medium of said frame for regulating the elevation of all of said devices simultaneously, and means provided on the frame for regulating the relative horizontal positions of said devices independently of each other.

4. In a sawing machine, an arbor, a plurality of saws mounted thereon, guides for the respective saws, said guides being arranged for independent horizontal movements and means whereby all of the guides are raised or lowered simultaneously.

5. In a sawing machine the combination of a saw arbor, a plurality of saws thereon, a frame mounted for swinging movements about the axis of said arbor, said frame being provided with a channel bar member disposed transversely of the machine and in front of the saws, a screw carried by said frame bar, an arm provided for each saw and connected to the frame for movements longitudinally thereof, said arms being provided with saw receiving slots, saw guiding elements carried by the respective arms, block attachments for each arm and extending into the channel of said bar member, worm wheels having hub elements journaled in the respective block attachments, said wheels being internally screw threaded to serve as nuts on said screw, worms provided in said block attachments for the respective worm wheels, and means to rotate said worms to cause said worm wheels to travel axially of the screw to adjust the arms and the saw guiding elements transversely of the machine.

Signed at Everett, Washington, this 3rd day of May, 1921.

DANIEL W. PARKER.

Witnesses:
FRED. P. BUELL,
S. W. WANGEN.